May 28, 1946.     C. B. LIVERS     2,401,258
HYDRAULIC ACTUATING MECHANISM
Filed July 21, 1942     2 Sheets-Sheet 1
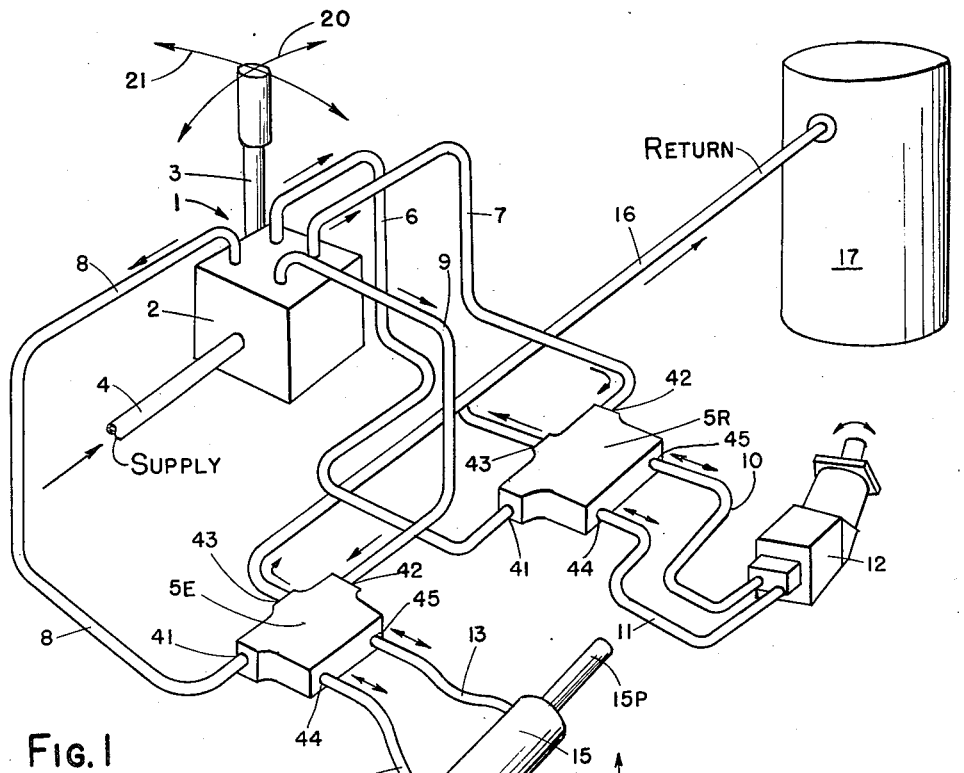
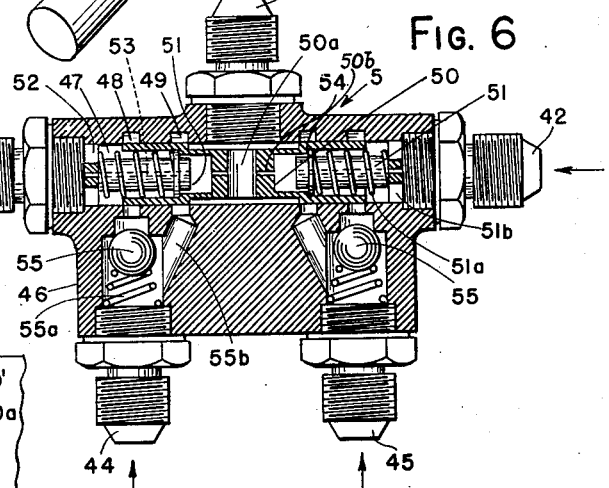
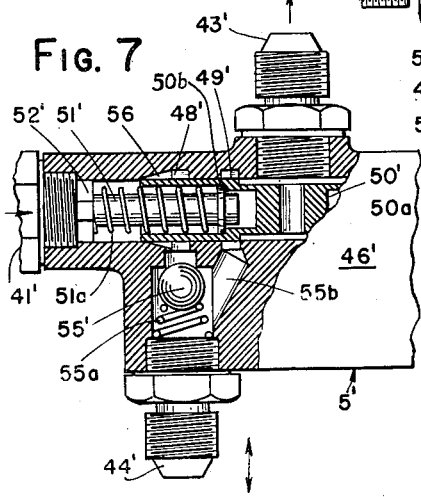
Carlos B. Livers
INVENTOR.
BY *James M. Clark*
HIS PATENT ATTORNEY May 28, 1946. C. B. LIVERS 2,401,258
HYDRAULIC ACTUATING MECHANISM
Filed July 21, 1942 2 Sheets-Sheet 2
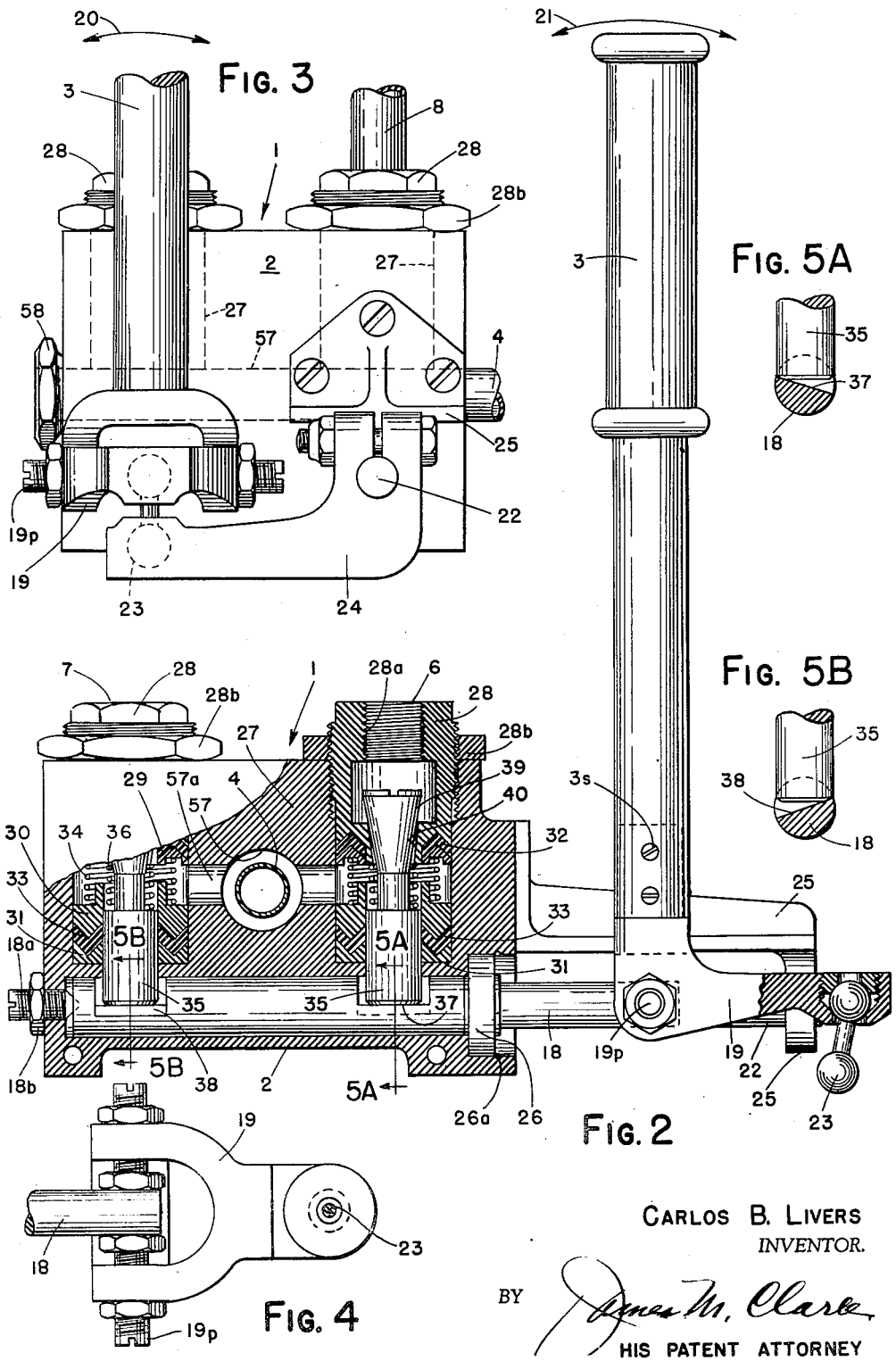
CARLOS B. LIVERS
INVENTOR.
BY James M. Clarke
HIS PATENT ATTORNEY Patented May 28, 1946

2,401,258

UNITED STATES PATENT OFFICE 2,401,258

HYDRAULIC ACTUATING MECHANISM

Carlos B. Livers, San Diego, Calif., assignor, by mesne assignments, to Consolidated Vultee Aircraft Corporation, a corporation of Delaware Application July 21, 1942, Serial No. 451,726

9 Claims. (Cl. 137—144)

The present invention relates to hydraulic systems for the operation of servo-motors or other hydraulically-actuated devices and more particularly to hydraulic devices for the control and actuation of movable guns, gun turrets and other components for aircraft, tanks and the like.

It is a primary object of the present invention to provide a manually controlled hydraulic system for the operation of a movable gun and/or gun turret in which the control device utilizes a hydraulic fluid at a relatively high pressure and is operated by the application of relatively small manual forces. It is another object to provide a simple and efficient fluid control system utilizing a single pair of control valves and an automatic actuating valve for each fluid motor such that a minimum of piping is required and the lines to the motor are economically utilized for flow in either direction depending upon the motor direction or movement, and in which the flow direction is automatically provided for by the actuating valve.

A further object resides in the provision of such a hydraulic control device which by virtue of the proportion of its parts, and the provision for a constant bleeding of the fluid, provides a light but definite "feel" in the control lever, and which also permits a very delicate control of the gun and gun turret, especially in the region of the neutral position of the control valve.

A still further object of the present invention resides in the provision of a manual control valve of the "stick" or lever-operated type, in which the flow of fluid is controlled through finely tapered valves by means of parallel cam shafts operated by a single lever with a linkage connection between the shafts. A further object resides in the provision of novel actuating or switching valves of a balanced type which provides for the continual bleeding of the fluid pressure and upon actuation automatically permits return flow from the fluid motor, automatically preventing its exerting a pressure upon the spring-balanced piston element of the valve which would cause its undesired movement in the opposed direction.

Other objects and advantages of the present hydraulic mechanism both in respect to the general arrangement of the system and the details of its respective parts, will become apparent to those skilled in the art after a reading of the following description and the accompanying drawings forming a part hereof.

In the drawings:

Fig. 1 is a diagrammatic view in perspective of a preferred form of my hydraulic system for the actuation of a movable aircraft gun and gun turret;

Fig. 2 is a partial cross-sectional view of the metering control valve assembly;

Fig. 3 is a partial end view of the valve assembly shown in Fig. 2;

Fig. 4 is a partial bottom view of the lever connection to the cam shaft as shown in Fig. 2;

Figs. 5A and 5B are sections taken along the lines 5A—5A and 5B—5B as indicated in Fig. 2;

Fig. 6 is a detailed sectional view of one of the actuating or switching valves utilized in the system shown in Fig. 1; and Fig. 7 is a partly sectioned detailed view of a modified form of actuating valve.

The hydraulic system, as shown diagrammatically in Fig. 1, is comprised essentially of a metering control valve assembly I having a valve body portion 2, being actuated by means of the manual control lever 3. The valve assembly body 2 is provided with a pressure inlet conduit 4 through which fluid under relatively high pressure is continually furnished by means of a motor driven pump or other suitable pressure source (not shown). The upper portion of the valve body 2 is provided with a plurality of outlet connections, namely 6, 7, 8 and 9, for carrying hydraulic fluid to the actuating valves 5R and 5E, which control the rotational and elevating motors, respectively, for the movement of the gun turret and its associated gun. It should be noted that the metering valve assembly I is utilized only for controlling the flow of the high pressure fluid from the pressure conduit 4 to the respective actuating valves 5 and fluid motors 12 and 15, the valve assembly in itself making no provision for the return flow of the fluid back to the pump. This return flow of fluid is in each case taken care of by the respective actuating valves 5R or 5E through which it is returned to the reservoir 17, suitable conduit means (not shown) being provided for supplying the pressure pump from the reservoir.

The valve assembly body 2 is provided at one side of its top portion with the outlet conduits 6 and 7 connecting with the right hand actuating valve 5R at its inlets 41 and 42, respectively, which valve 5R controls the operation of the turret rotating motor or servo-motor 12. The upper portion of the body 2 is also provided at its other side with the outlet conduits 8 and 9 connecting with the left hand actuating valve 5E at its inlet connections 41 and 42, this valve controlling the operation of the gun elevating motor or servo-motor cylinder 15. Each of the actuating valves 5R and 5E exhausts through the outlet connections 43 and the conduit 16 to the reservoir 17. The actuating valves 5R and 5E are identical with each other and occupy substantially similar positions within the hydraulic system and with respect to the turret rotating motor 12 and the gun elevating motor 15, respectively, which they control. Each actuating valve is provided with oppositely disposed pressure inlet connections 41 and 42 and intermediately disposed outlet connections 43 permitting fluid displaced by the respective hydraulic motors to be exhausted through the return conduit 16 to the reservoir 17, and the valves are each further provided with the connections 44 and 45 to the fluid motors 12 and 15 by which they are connected by means of the conduits 10, 11, 13 and 14. The details of the actuating valves shown in Figs. 6 and 7 will be hereinafter more fully explained.

Reference should now be made to Figs. 2 to 5 inclusive which show the details of the metering control valve assembly 1. The control handle or lever 3 is provided with a grip portion at its upper extremity and is fastened to the stub portion of the crank 19 by means of the attachment screws 3s. The crank 19 is pivotally carried upon the cam shaft 18 by means of the pin 19p such that rocking of the control lever 3 away from the reader in Fig. 2 imparts rotation to the cam shaft 18 and rocking in the direction of the arrows 21 in the same figure rotates the adjacent cam shaft 22 but has no effect upon cam shaft 18. The movement of the control lever 3 to secure rotational control of the cam shaft 18 is indicated in Fig. 3 by means of the arrows 20, which serves to control the flow of hydraulic fluid through the conduits 6 and 7 to the actuating valve 5R and thereby the control of the motor 12 which rotates the gun turret.

The elevational control of the gun secured by the rocking of control lever 3 in the direction of the arrows 21 in Fig. 2, imparts rotation to the cam shaft 22 by means of the crank 19, the ball link 23 and the link crank 24. This movement 21 of the lever causes corresponding operation of the valves in the control valve assembly 1 controlling the fluid flow through the conduits 8 and 9 to the actuating valve 5 and thence to the gun elevating motor 15 through the conduits 13 and 14. The cam shaft 22, which is substantially identical with cam shaft 18, is supported at its outer end by the bearing bracket 25, and the ball bearings 26 within which the cam shafts 18 and 22 are journalled, also serve as thrust bearings for each cam shaft.

The control valve body contains four vertical and parallel bores 27 each being threaded at its upper portion to take the four valve seats 28 which are each in turn threaded at their upper portions at 28a to take the fittings for the outlet conduits 6, 7, 8 and 9. A spring 34 and the retainers 29, 30 and 31 confine the packing 32 and 33 to give the required sealing for the chambers of each valve. The cam shafts 18 and 22 are each provided with transversely recessed cam portions 37 and 38, the cam contact portions being inclined at opposite angles at the neutral position of the lever 3, as may be more clearly seen in Figs. 5A and 5B. Each cam shaft is retained within the body 2 by means of the aforementioned thrust bearings 26 held by the retainer 26a and positioned by means of the coned set screws 18a held within the body 2 by means of the lock nut 18b. The movable elements of the control valve include the tapered metering valves 39 threaded into the cam follower pistons 35 which are normally held against the cam surfaces 37 and 38 of the cam shafts by means of the spring 36. The metering valve portions 39 comprise a frusto-conical portion having a relatively slight taper and under the influence of the springs 36, the valves 39 are caused to seat at the upper edge of the slightly lesser tapered bore 40. The transverse bore 57 of the valve body 2 is closed at one end by the screw plug 58, its opposite end being in open communication with the pressure inlet conduit 4 as shown in Figs. 2 and 3. Branch channels or bores 57a connect the main bore with each of the four valves.

In the operation of the metering control valve 1, movement of the control lever 3 to the right in Fig. 3 causes the nearest cam 37 to lift the follower piston 35 and its valve 39, thus permitting pressure fluid to flow from the central bore 57 through its branch, the metering valve, the outlet pipe 6 and thence to the right hand actuating valve 5R through its inlet 41. The aforementioned movement of the lever 3 corresponds to a clockwise rotation of the cam shaft 18 as viewed in Figs. 5A and 5B from which it will be noted that this rotational movement of the cam 38 does not operate its piston 35 nor does it open the corresponding valve 39 for the flow of the fluid into the outlet connection 7. Similarly, rocking of the lever to the left in Fig. 3 will cause the cam 38 to open its corresponding valve and permit fluid to flow out through the connection 7; and movement of the lever to the left in Fig. 2 toward the valve in the direction of the arrows 21, imparts clockwise rotation to the cam shaft 22 as viewed in Fig. 3 causing opening of the nearby valve and conduit 8. In a like manner, rotation of the lever 3 to the right, or away from the valve, as viewed in Fig. 2 imparts counterclockwise rotation to the cam shaft 22 and opening of the valve at the farther end of the valve body which controls the hydraulic pressure fluid into the conduit 9; the pair of valves controlled by rocking of the cam shaft 22 are the valves which control the fluid flow to the gun elevating motor 15 through the conduits 8 and 9 and its actuating valve 5E.

It should be noted particularly that the piston 35 is arranged to have a slightly greater cross-sectional area than that of the tapered poppet valve at its seat. This difference in areas is relatively important and has been found to result in a slight but definite degree of reactive force or "feel" in the control lever whereby the operator has but to exert a relatively small manual force applied to the control lever 3 but he in turn feels to a relatively delicate degree the effect of such movement. This is an important feature of any hydraulically controlled gun and turret combination in which it is necessary that both the turret be rotated and the gun be elevated or lowered to properly train the gun sights upon a moving target which frequently is moving in a plane other than those in which the turret rotates, or in which the gun is elevated. The force required to move the control lever varies in proportion to the speed of the turret and the gun movement and the relatively small taper of the poppet valve 39 permits a very delicate control, especially about the neutral position. The threaded valve seat 28 is screwed into the housing 2 in an easily adjustable relationship such that with the piston 35 resting upon the cam 37 the seat can be set in the proper position with relation to the poppet valve 39, in which position it is locked or retained by the threaded lock nut 28b. In order to properly keep the hydraulic system in condition for instant operation, the four valve seats 26 are adjusted such that there is a slight continuous bleeding of pressure fluid past the poppet valves 39 into the conduits 6, 7, 8 and 9 to the actuating valves 5R and 5E through the outlets 43 and conduit 16 to the reservoir 17.

Referring again to Fig. 1, it will be seen that the rotation of the gun turret may be obtained by movement of the control lever 3 in the direction indicated by the arrows 20. In other words, movement of the lever toward the upper right, in Fig. 1, will impart rotation to the turret through the actuating valve 5R and the rotary fluid motor 12 in one direction, and likewise a movement of the lever 3 toward the lower left along the line of the arrows 20 will cause a reversal of the fluid motor 12 with a concurrent change in direction of rotation of the gun turret. Likewise, when the control lever 3 is rocked toward the valve body 2 to the lower right, as viewed in Fig. 1 along the lines of the arrows 21, the valve is opened which permits hydraulic fluid under pressure to flow out through the conduit 8 through the selector valve 5E to the elevating motor 15. During this movement of the lever 3, and in its movement in the opposite direction which opens the valve controlling the flow into conduit 9, the cam shaft 18 is unaffected and is not rotated for the actuation of the other valve pistons with which it is in contact. This is due to the lever 3 merely rocking about the axis of the pin 19p causing all of this movement to be transmitted through the crank 19, the ball link 23 and the link crank 24 to the adjacent cam shaft 22. It will therefore be seen that the movement of the control lever 3 closely simulates that of the control stick of an airplane such that movement laterally along the line of the arrows 20 controls the flow to the rotating motor 12 which causes the turret to swing about in a directional manner, whereas fore and aft movement of the lever 3 along the path 21 of the arrows controls flow to the elevating motor 15 such that the gun is either nosed downwardly or elevated to a higher angle much after the flight movements of an airplane when its control stick is moved in similar directions. It is also possible to combine these movements such that the control lever 3 may be moved diagonally between the paths of the arrows 20 and 21 in which case a combined simultaneous rotating and elevating movement is obtained.

The details of the fluid-operated motors 12 and 15 in themselves form no novel part of the present invention and they have accordingly not been shown or described in detail. From their diagrammatic showing in Fig. 1, and the present description, however, they will be recognized by those skilled in the art as of well known types for the actuation of aircraft gun turrets, armament and other similar components. The turret rotating motor 12 is a rotary fluid-operated device which transmits fluid flow under pressure in either direction to a reversible drive shaft which is suitably geared or otherwise connected to the rotatable turret, which in turn is suitably guided for movement around a circular or other shaped track provided with suitable locking devices to fix the turret to the aircraft when desired. The gun elevating motor 15 is a fluid-actuated strut or piston-cylinder combination which transmits flow of the fluid in either direction into a rectilinear telescoping of the piston with respect to its cylinder. This axial movement of the piston within its cylinder is suitably transmitted to the gun, which is preferably pivoted at another point such that fluid flow in the proper direction imparts elevating or lowering movements to the gun. Obviously, other fluid-actuated motors might be substituted for those indicated in Fig. 1 to suit specific conditions as may be desired.

Referring now to Fig. 6, there is shown in detail one of the two identical actuating valves 5 which may be used in the position indicated at either 5R or 5E as shown in the diagram of the fluid system. These valves serve to automatically provide a means for the return of the fluid which is displaced from the hydraulic cylinders or motors 12 and 15, to the reservoir 17, while at the same time automatically permitting and determining the direction of the flow of the high pressure fluid in the proper directions to and from the fluid motor. Each of the valves 5 is symmetrical about its center line of the connection 43 and is comprised of an integral valve housing or body 46 which contains a longitudinal bore 47 provided with annular grooves 48 and 49. Within the bore 47 there is disposed a piston 50 of a tubular construction having enlarged cylindrical end portions of a diameter to reciprocate within the bore 47 of the housing.

The tubular end portions of the piston 50 are shouldered at 50b into a reduced tubular portion and spring assemblies 51 are disposed within the enlarged bores at each end of the piston and arranged to bear against these shoulders. The central portion of the piston 50 is provided with a transverse opening 50a which is substantially in alignment with the outlet connection 43, or the center line of symmetry of the valve in the neutral position of the piston. Relatively fine or small diameter bores 53 and 54 are provided centrally through the piston 50 and the spring assembly 51 in a longitudinal direction of the bore 47. The flange 51b of the spring assembly 51 is provided with several slots 52 to permit fluid flow to pass around the outside of the spring assembly and to reach the piston. The spring assembly 51 includes a compression spring 51a normally compressed between the shoulder 50b of the piston and the flange 51b of the spring assembly. The small bores 53 and 54 in both the spring assembly and the piston serve to carry the bleeder fluid through the valve from the inlets 41 and 42 to the outlet 43 and thence to the reservoir 17. At each side of the valve body 47 there are parallel bores communicating with the grooves 48 and within which the ball check valves 55 urged by the springs 55a are disposed. Branch ducts 55b communicate directly with the grooves 49 from the connection 44 and 45 by-passing the valves 55.

Continuing to refer to Fig. 6, hydraulic fluid under pressure passing through the conduits 6 or 8 enters at the inlet 41 of the valve 5 and forces the piston 50 to move to the right against the opposite spring assembly 51, the piston moving to a position in which its left end clears the annular groove 48 permitting the fluid to pass through the ball check valve 55 and the outlet 44. The high pressure fluid then passes along through either the conduit 11 or 14 and through either the turret rotating motor 12 or the gun elevating cylinder 15, as the case may be. On the opposite, or right side of the valve 5 the enlarged portion of the piston 50 has cleared the innermost annular groove 49 thereby permitting fluid which is displaced or exhausted from the cylinder or motor to pass out through the outlet 43 to the reservoir 17.

While the operation is continuing in which the high pressure fluid enters the inlet 41 moving past the left end of the displaced piston 50 and passing out through the left check valve 55 and through the outlet 44, the opposite, or right hand, check valve 55 prevents the high pressure fluid which is displaced or exhausted from the cylinder 15, or the motor 12, from leaking back past the piston 50 and causing it to move in the wrong direction. This displaced high pressure exhaust fluid coming from the fluid cylinder may momentarily be higher than the pressure of the fluid entering at 41, particularly at those times immediately following a movement of the control handle 3 when it is quickly brought back to its near neutral position. Obviously when the pressure fluid is caused to flow through the conduits 7 and 9 and enters at the right hand inlet 42 of the valve the sequence of the above described operation is identical but in the reversed direction.

In Fig. 7 there is shown a modified form of an actuating valve 5' which is adapted to give more delicate control of the fluid supply and accordingly a finer or closer operation of the turret and gun moving motors. In this improved form of the valve the piston has been lengthened in the direction of the bore 47' and the spring assembly 51' has also been extended to accommodate the increase in piston length. The body 46' is also enlarged slightly to suit the change in size of the piston 50' and the spring assembly 51'. A number of longitudinally extending tapered slots 56 are cut into the walls of the bore 47' and connect with the outer annular groove 48'. These slots, of which six to ten were found to give satisfactory results, cause a more delicate control of the fluid supply and in turn the operation of the gun elevating cylinder and the turret rotating motor may be more finely operated. Instead of the slots 56, a continuous annular ramp-like groove, similarly placed and serving the same purpose, may be employed, of course. The valve 5' is otherwise identical in structure and function with the previously described valve 5 and while it will work satisfactorily without the bleeding apertures 53 and 54, their use has proven very satisfactory.

It will become apparent from the diagrammatic arrangement of the valves and conduits to the fluid motors shown in Fig. 1, that as compared to prior system arrangements there is an appreciable saving in the weight and length of the conduits or piping required to give the results which is attainable by the present system. Among these savings are the arrangement which permits the control valve 1 to be utilized only for control of the higher fluid pressure and which simplifies the construction and operation of this device by avoiding the necessity of its additionally handling the return flow displaced by the movable elements of the fluid motors. This problem is efficiently taken care of by the automatic actuating or flow-direction determining valves 5 which can be located remote from the operator and at any convenient point in the system since they do not require manual operation. It will also be noted that the branch lines 10, 11, 13 and 14 to the fluid motors are utilized for flow in both directions and that the return flow after passing through the actuating valves can be returned directly to the reservoir without the necessity of passing through double acting valves arranged to operate concurrently with the control valve in the control assembly 1. While the preferred embodiment, which has been shown in the drawings and described herein for explanatory purposes only, indicates a system for two fluid motors, it will be apparent that the system disclosed together with the valves 1 and 5 are fully applicable to the operation of a single fluid motor or to a plurality of motors. A single motor system, for example, would comprise simply a two-valve control assembly at 1, the conduits 6 and 7, the actuating valve 5R and the conduits 10 and 11 to the fluid motor 12 in a system in which the second motor 15 and all of its associated valves and piping would be dispensed with.

Other forms and modifications of the present invention both with respect to the general arrangements and its specific details are intended to come within the scope and spirit of the present invention as more completely defined in the appended claims. While the use of this invention has been shown in connection with an aircraft gun turret, it will be apparent to those skilled in the art that the invention is by no means limited thereto, but may be used to advantage wherever a sensitive hydraulic control of this type is needed, as, for example, in connection with hoists and cranes, excavating, farming and roadbuilding machinery, etc.

I claim:

1. A cam-actuated control valve comprising a body portion, adjacent pairs of vertically disposed valve units housed within said body portion, each said valve unit comprising a tapered valve seat, a movable conic valve having a lower cam follower portion and an intermediate chamber portion, resilient means disposed within said chamber portion for normally urging the movable valve unit into its closed and cam contacting position, a common fluid bore in communication with each of the said intermediate chambers of each said valve units, a pair of adjacent and parallel cam shaft elements each disposed such that it lies within the plane of a pair of said valve units, each said cam shaft element journalled for rotation within said body portion and provided with non-parallel camming surfaces adapted to contact the cam follower portions of said valve units with the camming surfaces oppositely inclined in the neutral position thereof, a control lever in the form of a bellcrank having a hand grip portion adjacent one terminal, a link portion adjacent its other terminal, and a pivotal connection at its intermediate portion whereby it is transversely pivoted to a first of said shaft elements, the second said shaft having a levered element attached thereto for imparting rotary movement to the same, and universal linkage means interconnecting the outer terminal of said levered means of said second shaft with the linkage terminal of said bellcrank lever whereby lateral movement of the control lever imparts rocking movement to said first shaft with concurrent opening and closing of the respective valves in its pair without imparting rotary motion to said second shaft, and movement of said lever within the plane passing through the axes of the first said shaft and the valve units cooperating therewith imparts rotary movement of said second shaft through the medium of said universal linkage without imparting movement to said first shaft.

2. A valve mechanism comprising a body member, a pair of parallel valve chambers having tapered seats disposed within said member, a fluid inlet port extending into said body member in communication with each said valve chamber, a rotatable cam shaft journalled within said body member and extending across the inner ends of said chambers, tapered metering valves disposed within said chamber portions having piston follower portions extending through said chamber inner ends, oppositely inclined cam portions formed upon said cam shaft such that each cam portion is in contact with one of said follower portions, spring means acting upon said metering valves tending to close the same and maintain the follower portions thereof in contact with the said cam portions of said cam shaft, said valves each normally being in a slightly opened position to permit a fluid bleeding therethrough in the neutral position of said cam shaft and manual means associated with said cam shaft for rotation of the same to open one said valve while closing the other.

3. A fluid control valve comprising a body member, a fluid conducting channel extending into said member, two pairs of valve chambers in communication with said channel disposed within said body member, tapered metering valve elements movably supported within each said valve chamber, valve seats of slightly lesser taper adjustably supported by said body member within each said valve chamber, a piston element carried by each said valve element, a pair of rockable shafts journaled within said body member, a first of said shafts extending adjacent a first pair of said valve elements and having oppositely inclined camming portions in contact with the piston portions thereof in the neutral position of each said shaft, a second said shaft in contact with the piston portions of a second said pair of valve elements, elastic means engaging said valve elements urging the same into closed position, individual outlet connections communicating with said valve chamber portions through said valve seat openings, each said tapered valve in each pair being closely spaced from its respective valve seat in the neutral position of said shaft to permit a bleeding flow from said fluid channel through each said valve into its respective outlet connection in the neutral position of its respective rockable shaft, and manually operated means associated with each said shaft adapted to selectively open and close said respective valve chambers.

4. The combination with a fluid control valve including a body member, dual pairs of parallel valve units, each said valve unit comprising a slightly tapered valve engageable with a valve seat of appreciably lesser taper, said valve units including piston follower portions and intermediate spring means urging said valve units into their closed positions, an actuating cam shaft transversely disposed in parallel relationship under a first pair of said valve units in contact with the piston followers thereof, a second actuating cam shaft transversely disposed in parallel relationship under a second pair of said valve units in contact with the respective piston followers thereof, said cam shafts including oppositely tapered camming portions arranged such that the valves in each pair are held slightly open in the neutral position of its respective shaft, manual stick control means transversely pivoted to a first of said cam shafts for selective rotation thereof without pivotal movement about said transverse pivot, and linkage means interconnecting said stick control with said second cam shaft such that movement of said stick control about said transverse pivot imparts rotation to said second shaft through said linkage means, and intermediate angular movements of said stick control impart concurrent rotation to each said cam shaft for the simultaneous closing and opening of the respective valve elements.

5. In a control valve including a plurality of cam actuated valve elements and a pair of rotatable cam shafts for the actuation of said valve elements, manual stick control means for the selective rotation of said cam shafts including a bellcrank lever having its intermediate portion pivotally mounted upon an axis transversely disposed with respect to a first of said cam shafts, a terminal portion of said bellcrank lever including a grip portion for the manual application of stick control forces, lever means attached to a second of said cam shafts and universal linkage means interconnecting said second shaft lever means with a terminal of said bellcrank lever whereby intermediate angular movements of said stick control lever about both its transverse and first said shaft axes results in the selective rotation of each said cam shaft and its respective associated valve elements.

6. In a cam actuated control valve, a body member, a chamber in said body member, a valve seat element adjustably supported within said chamber, said valve seat element having a slightly tapered conical valve seat at its inner end and means for attaching a conduit to its outer end, an inner guide element retained within said chamber, sealing means disposed adjacent the inner opposed faces of said seat element and said guide element, sealing retaining means including a compression spring maintaining said sealing means in contact with said chamber walls and said respective elements, a movable valve element comprising a conic valve portion of greater taper than said valve seat, a piston follower portion adapted for sliding movements within said inner guide element and an intermediate neck portion of lesser diameter, a compression spring interposed between said piston follower portion and said valve seat element about said neck portion adapted to urge said valve into its closed position, and cam actuating means adapted to engage said piston follower portion for the opening and control of said valve.

7. In a control valve mechanism, a body member, a seat adjustably supported within said body member, a slightly tapered opening in said valve seat, a movable valve element having a slightly greater tapered portion mounted for movement within said valve seat opening, resilient means urging said valve element into engagement with said valve seat, the said movable valve element having a piston portion carried thereby, a fluid supply conduit in communication with said valve seat opening and said piston portion, a fluid outlet from said body member, the diameter of said piston portion in communication with said fluid supply slightly exceeding that of said valve seat opening, operating means comprising a rotatable shaft having a camming portion adapted for the movement of said valve element by engagement with its said piston portion, and manual means associated with said shaft for the rotation thereof whereby the metering of fluid flow from said inlet through said outlet imparts a reactive force to said manual means.

8. A fluid control valve comprising a body member, a fluid bore extending into said member, dual pairs of valve chambers in said body member in communication with said bore, tapered valve seats adjustably supported by said body member, tapered valve elements disposed within said valve chambers, a first rotatable shaft element having eccentric cam portions in contact with a first pair of said valve elements, a second shaft element having eccentric cam portions in contact with a second pair of said valve elements, a control lever pivotally mounted upon the first of said shaft elements, said control lever having an offset portion adjacent said pivotal mounting and means interconnecting said lever offset portion with the second said shaft element whereby the first said shaft element may be rotated selectively and the second said shaft element may be rotated by said control lever without imparting rotation to the first said shaft element, and alternatively whereby both said shaft elements and the respective contacting valve elements may be operated concurrently by other movements of said control lever.

9. A fluid control valve comprising a body member, a plurality of valve chambers disposed within said body member, a pressure inlet connection within said body member in fluid communication with said chambers, said valve chambers being disposed in at least two rows with at least two chambers in each row with their axes extending parallel to each other, tapered seats adjustably supported within said valve chambers, a tapered metering valve element movably mounted within each of said valve chambers, a first shaft having eccentric camming portions in operating contact with each of the said valve elements in the first of said rows, a second shaft having eccentric camming portions in operating contact with each of the said valve elements in the second of said rows, a control lever pivotally carried on a transverse axis by the first of said shafts and linkage interconnecting the said control lever with the second said shaft in such manner that manual movement of said control lever about said transverse axis imparts rotary movement to said second shaft and actuation of its contacting valve elements in the second said row, movements of said control lever about the axis of said first shaft imparts rotation thereto and operation of its contacting valve elements in the first said row, and intermediate movement of said control lever selectively rotates both said shafts for the opening and closing of the respective valve elements in each of said rows.

CARLOS B. LIVERS.